United States Patent
Oyman et al.

(10) Patent No.: US 8,031,605 B2
(45) Date of Patent: Oct. 4, 2011

(54) SYSTEM AND METHOD FOR NODE-CLUSTERING AND MULTI-HOP ROUTING IN WIDEBAND WIRELESS AD-HOC NETWORKS

(75) Inventors: Ozgur Oyman, Palo Alto, CA (US); Sumeet Sandhu, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 793 days.

(21) Appl. No.: 12/059,682

(22) Filed: Mar. 31, 2008

(65) Prior Publication Data

US 2009/0245159 A1 Oct. 1, 2009

(51) Int. Cl.
*H04W 28/12* (2009.01)
*H04W 28/26* (2009.01)
*H04W 40/08* (2009.01)

(52) U.S. Cl. ......... 370/235; 370/252; 455/445; 709/241

(58) Field of Classification Search .............. 370/229, 370/231, 232, 235, 236, 238, 241, 252; 455/445, 455/447, 450, 452.1; 709/241
See application file for complete search history.

(56) References Cited

U.S. PATENT DOCUMENTS

| | | | | |
|---|---|---|---|---|
| 7,177,295 B1* | 2/2007 | Sholander et al. | | 370/338 |
| 7,532,585 B2* | 5/2009 | Kim et al. | | 370/254 |
| 7,570,593 B1* | 8/2009 | ElBatt et al. | | 370/238 |
| 7,764,617 B2* | 7/2010 | Cain et al. | | 370/238 |
| 2005/0063313 A1* | 3/2005 | Nanavati et al. | | 370/252 |
| 2005/0073962 A1* | 4/2005 | Zabele et al. | | 370/254 |
| 2005/0094574 A1* | 5/2005 | Han et al. | | 370/254 |
| 2005/0135309 A1* | 6/2005 | Hester et al. | | 370/331 |
| 2007/0195702 A1* | 8/2007 | Yuen et al. | | 370/238 |
| 2007/0206547 A1* | 9/2007 | Gong et al. | | 370/338 |
| 2007/0299950 A1* | 12/2007 | Kulkarni | | 709/223 |
| 2008/0037305 A1* | 2/2008 | Kumar et al. | | 370/342 |
| 2008/0253327 A1* | 10/2008 | Kohvakka et al. | | 370/330 |
| 2009/0052327 A1* | 2/2009 | Larsson et al. | | 370/238 |
| 2009/0147723 A1* | 6/2009 | Fang et al. | | 370/315 |
| 2009/0213849 A1* | 8/2009 | Sachs et al. | | 370/389 |
| 2009/0312028 A1* | 12/2009 | Burchfiel | | 455/450 |
| 2010/0284383 A1* | 11/2010 | Levendel et al. | | 370/338 |

OTHER PUBLICATIONS

Fernando et al, A Viterbi-Like Algorithm With Adaptive Clustering for Channel Assignment in Cellular Radio Networks pp. 73-87.*

* cited by examiner

*Primary Examiner* — Chi Pham
*Assistant Examiner* — Ahmed Elallam
(74) *Attorney, Agent, or Firm* — Schwabe, Williamson & Wyatt, P.C.

(57) ABSTRACT

An ad-hoc network system for computing a proposed number of node-clusters that enable a relative threshold data rate. The ad-hoc network system includes a source terminal, a destination terminal, a plurality of relay terminals, and a cluster determination engine. The source terminal sends a network communication to a destination terminal via a plurality of relay terminals. The cluster determination engine computes a threshold data rate, C, for a number of hops, N, based on a transmission power constraint. The cluster determination engine determines a proposed route for the wireless communication from the source terminal to the destination terminal according to the threshold data rate, C.

12 Claims, 4 Drawing Sheets

SYSTEM AND METHOD FOR NODE-CLUSTERING AND MULTI-HOP ROUTING IN WIDEBAND WIRELESS AD-HOC NETWORKS

BACKGROUND OF THE INVENTION

One of the features of modern communication networks is their ability to support ad-hoc networking. Ad-hoc networking includes a diverse number of networking technologies, including mobile ad-hoc networks (MANet), mesh networks, cellular networks, sensor networks, peer-to-peer networks, wireless personal area networks (WPAN), wireless local area networks (WLAN), ultra-wideband networks (UWB), backhaul connectivity of infrastructure devices such as wireless wide area networks (WWAN), and wireless metropolitan area networks (WMAN) such as WiMAX.

The design of efficient multi-hop routing algorithms to accommodate ad-hoc wireless communication is a factor toward achieving performance with very high throughputs and data rates. Very high throughput (VHT) applications such as wireless HDTV and wireless gigabit Ethernet are enabled by the use of higher bandwidths. The increasing availability of wireless access over larger chunks of spectrum (e.g., 7 GHz of unlicensed spectrum in the 60 GHz band) makes bandwidth and operating frequency useful parameters in the development of mesh architectures and multi-hop routing strategies in WPANs, WLANs and WWANs.

Multi-hop relaying technology enables spectral efficiency and power efficiency enhancements over long-range and/or large bandwidth communications (e.g., UWB) over the high end of the spectrum (the latter leads to a high path loss exponent) through path loss mitigation.

BRIEF DESCRIPTION OF THE DRAWINGS

Throughout the description, similar reference numbers may be used to identify similar elements.

DETAILED DESCRIPTION

Figure 1:
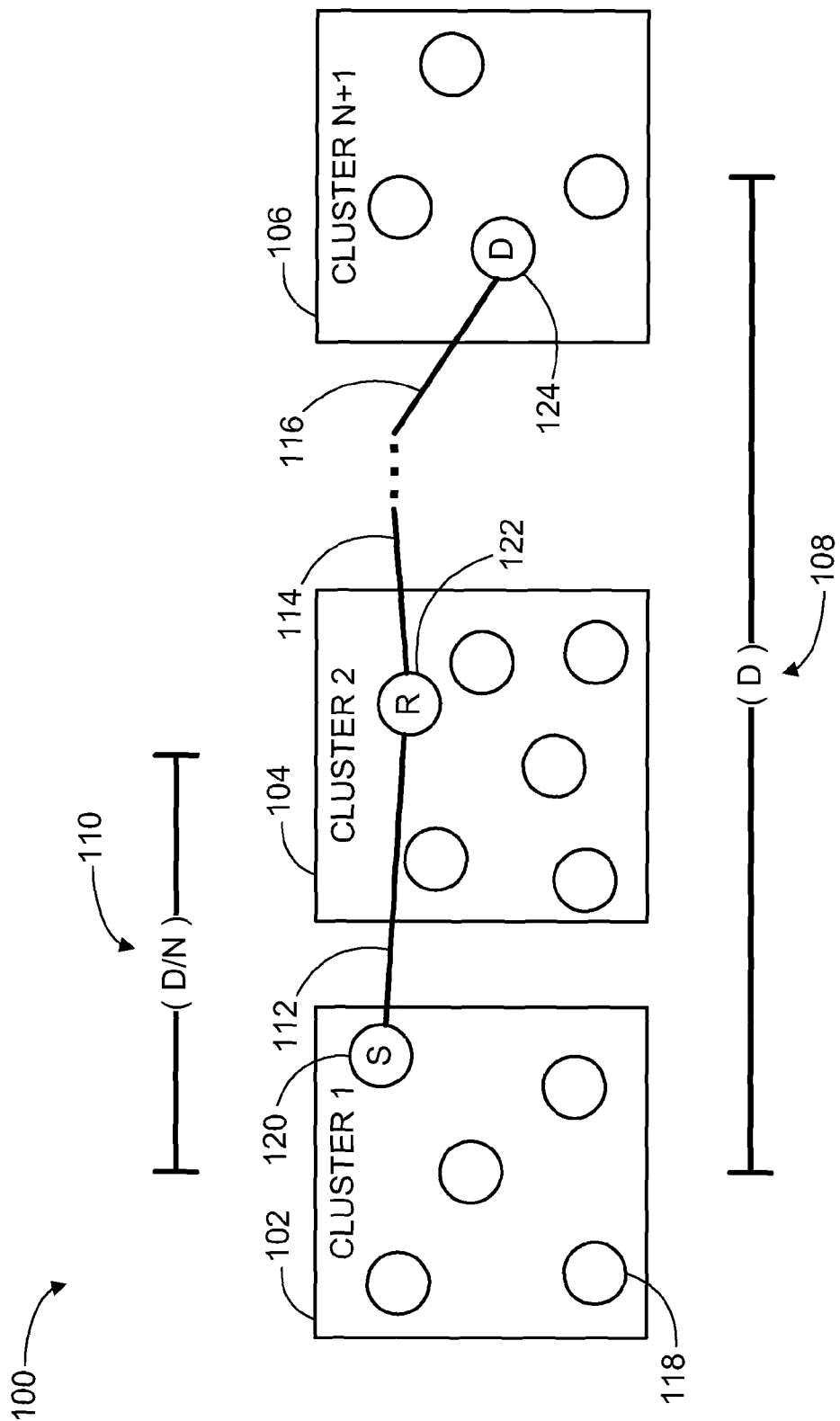
FIG. 1 depicts a schematic diagram of one embodiment of an ad-hoc network system of a plurality of ad-hoc network terminals.

FIG. 1 depicts a schematic diagram of one embodiment of an ad-hoc network system 100 of a plurality of ad-hoc network terminals. As depicted in FIG. 1, a number of nodes, or terminals, in the network are partitioned into groups called clusters. The ad-hoc network system 100 includes a source cluster 102, a relay cluster 104, and a destination cluster 106. Although the ad-hoc network system 100 is shown and described herein with certain components and functionality, other embodiments of the ad-hoc network system 100 may be implemented with fewer or more components or with less or more functionality. For example, some embodiments of the ad-hoc network system 100 include a plurality of source clusters 102, a plurality of relay terminals 104, and a plurality of destination clusters 106 which communicate a plurality of separate network communications. Additionally, some embodiments of the ad-hoc network system 100 include similar components arranged in another manner to provide similar functionality, in one or more aspects.

In one embodiment, each cluster is constrained to accommodate a limited number of terminals. As one example, a cluster may contain at most sixteen terminals. In one embodiment, the inclusion of a terminal in a cluster is based on the geographic location of the terminal in relation to the geographically defined border of a cluster or a distance (e.g., geographic or electronic) among terminals. For example, a mobile terminal may move from the border of a first cluster to a second cluster as the mobile terminal leaves the area of the first cluster and enters the area of the second cluster. In one embodiment, a cluster contains fixed and/or mobile terminals. In other words, the placement of the terminals may be regularly or irregularly positioned, and may include infrastructure devices and/or client devices.

In one embodiment, the ad-hoc network system 100 operates according to a wireless networking standard. Furthermore, the ad-hoc network system 100 may implement a WiMAX network or other similar wireless wide area network (WWAN) such as high-speed packet access (HSPA) networks, universal mobile telecommunications system (UMTS) networks, and/or third generation partnership project (3GPP) networks. In some embodiments, the ad-hoc network system 100 implements a personal area network (PAN), which may include home appliances and personal computing devices, as well as office equipment and office computing devices. Likewise, the ad-hoc network system 100 may include a digital subscriber line (xDSL) network, satellite network, and/or a coaxial cable network. Additionally, in some embodiments, the ad-hoc network system 100 includes a telephone network, a local area network (LAN), a wide area network (WAN), including the internet, and may be an Ethernet network such as a 10Base-T, 100Base-T, or gigabit Ethernet.

In one embodiment, the ad-hoc network system 100 includes a mesh network. A mesh network, which may be a subset of ad-hoc networks, connects a variety of terminals, or nodes, together into a mesh of continuous connections that may be continually reconfigured to route a network communication around broken or blocked paths by "hopping" from node to node until the destination is reached. Thus, a mesh network is self-healing in that the network can still find a route from a source node to a destination node in the event an intermediate node breaks down or a connection goes bad. A mesh network is applicable to wireless networks, wired networks, and software interaction. Additionally, a node is a network junction or connection point. Every computer, hub, switch, and router may be a node. A node, or terminal, may include a variety of home and office devices and systems, as well as computers within transportation vehicles. A node may include printers, workstations, databases, servers, cellphones, personal digital assistants (PDAs), laptops, desktops, digital cameras, and security cameras. Additionally, house appliances such as a fridge, a microwave, a thermostat, as well as home and office systems, including plumbing systems, alarm systems, electrical systems, and/or a heating, ventilating, and air conditioning (HVAC) systems may be connected to a network and configured to send and receive network communications, each device or system being a node in the ad-hoc and/or mesh network.

In the depicted FIG. 1 the source cluster 102 includes a source terminal 120 that initiates a network communication for communication across the ad-hoc network system 100 to a destination terminal 124 in the destination cluster 106. The network communication is relayed across the ad-hoc network system 100 through at least one of the plurality of relay terminals 122 that is included in a relay cluster 104.

In one embodiment, the source cluster 102 includes a plurality of redundant terminals 118 that, for a given network communication, are not implemented to transmit a packet of the network communication. Likewise, the relay cluster 104 and the destination cluster 106 include a plurality of redundant terminals 118. Any given cluster, in one embodiment, may contain a first source terminal that generates and sends a first network communication, and a second source terminal, different from the first source terminal, that generates and sends a second network communication. Furthermore, any given cluster may also contain a first relay terminal that relays a first relayed network communication, and may also contain a second relay terminal that relays a second relayed network communication. Thus, any given cluster may handle a plurality of different and potentially overlapping network communications at any given time.

In one embodiment, a cluster is separated from another adjacent cluster by an inter-cluster separation 110, a median distance from one cluster to the next, which is the hop distance. Furthermore, the inter-cluster separation 110 may be configured to depend on the overall cluster distance 108 from the source cluster 102 to the destination cluster 106. There are N number of hops for N+1 clusters. As depicted, the source cluster 102 hops to the relay cluster 104 with a first hop 112. In one embodiment, each hop, including the first hop 112, has a hop distance of roughly D/N, where D is the distance between the source terminal 120 and the destination terminal 124, and N is the number of hops. The relay cluster 104 then hops to another relay cluster with a second hop 114. The last relay cluster, which may be the relay cluster 104 in the case that the relay cluster 104 is the last and only relay cluster, then sends the packet in a hop to the destination cluster 106 with the last hop 116.

Figure 2:
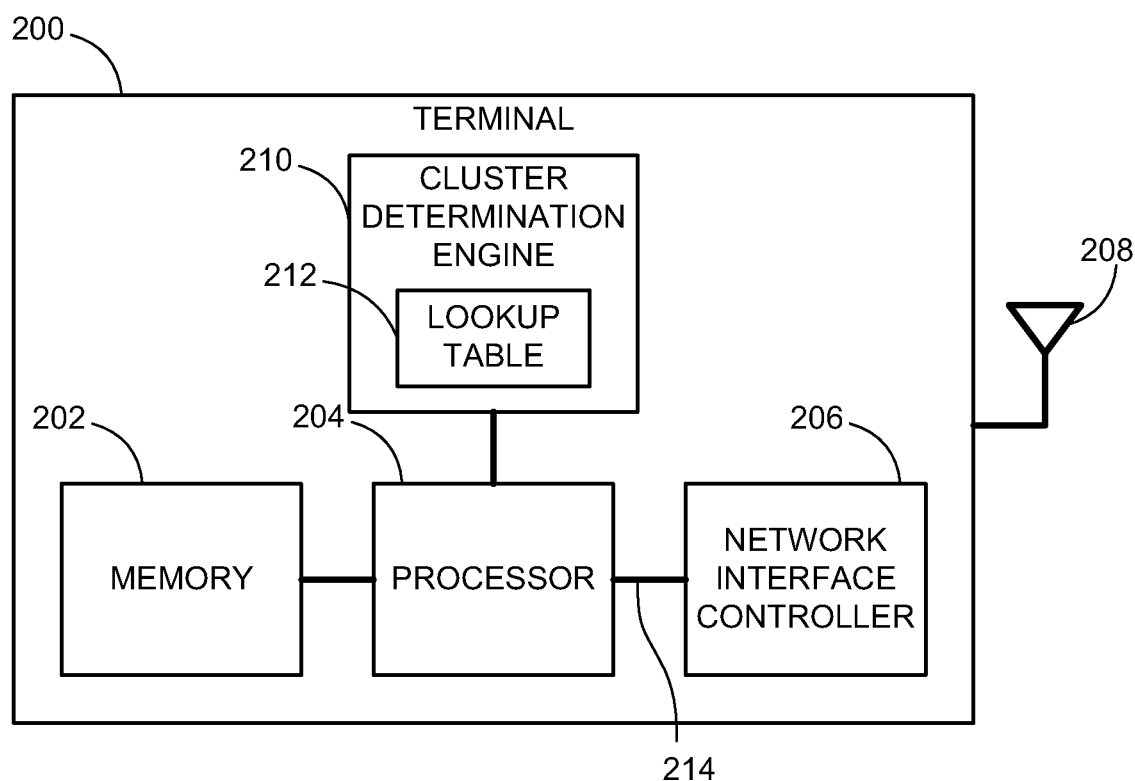
FIG. 2 depicts a schematic diagram of one embodiment of an ad-hoc network terminal.

FIG. 2 depicts a schematic diagram of one embodiment of an ad-hoc network terminal 200. The ad-hoc network terminal 200 includes a memory device 202, a processor 204, a network interface controller 206, at least one antenna 208, a cluster determination engine 210, a look-up table 212, and one or more bus interfaces 214. In one embodiment, the bus interfaces 214 facilitate communications related to the cluster determination engine 210 and/or cluster routing protocols which execute on the terminal 200. Exemplary cluster routing protocols, include processing cluster commands, as well as commands for storing, sending, and receiving data packets associated with the cluster operations of the cluster determination engine 202. Although the depicted terminal 200 is shown and described herein with certain components and functionality, other embodiments of the terminal 200 may be implemented with fewer or more components or with less or more functionality.

In some embodiments, the memory device 202 is a random access memory (RAM) or another type of dynamic storage device. In other embodiments, the memory device 202 is a read-only memory (ROM) or another type of static storage device. In other embodiments, the illustrated memory device 202 is representative of both RAM and static storage memory within a terminal 200. In some embodiments, the processor 204 is a central processing unit (CPU) with one or more processing cores. In other embodiments, the processor 204 is a network processing unit (NPU) or another type of processing device such as a general purpose processor, an application specific processor, a multi-core processor, or a microprocessor. Alternatively, a separate processor may be coupled to the cluster determination engine 210.

The network interface controller 206 is a hardware interface that handles and allows the terminal 200 to access a computer network such as the ad-hoc network system 100. In one embodiment, the network interface controller 206 facilitates initial connections and route enquiry protocols, or network discovery protocols, between the terminal 200 and other terminals in the ad-hoc network system 100. In some embodiments, the network interface controller 206 maintains a connection established between the terminal 200 and at least one other terminal.

The antenna 208 transmits and/or receives network communications between the terminal 200 and at least one other terminal in the ad-hoc network system 100. In one embodiment, the antenna 208 is an omni-directional antenna. In another embodiment, the antenna 208 is a directional antenna. In one embodiment, the antenna 208 is panel, sector, point-to-point antenna and/or another similar antenna. In a further embodiment, the antenna 208 includes multiple antennas attached to the terminal 200, such as the multiple antennas used in multiple-input and multiple-output (MIMO) systems.

The cluster determination engine 210 computes a proposed number of hops in transmitting a network communication between a source terminal 120 and a destination terminal 124. The cluster determination engine 210 includes a lookup table 212. In one embodiment, there are N+1 clusters and N−1 relay terminals for every N number of hops between the source terminal 120 and the destination terminal 124. In one embodiment, the cluster determination engine 210 includes an application-specific integrated circuit (ASIC) customized for calculating the proposed number of hops between the source terminal 120 and the destination terminal 124.

In one embodiment, the cluster determination engine 210 utilizes certain criterion to estimate the proposed number of hops, N*, for multi-hop routing and clustering as a function of the physical channel parameters such as range, path loss exponent, spectrum availability, channel bandwidth, operating frequency, and terminal transmission power constraints. The specific multi-hop routing and clustering algorithms can use the proposed number of hops N and the resultant proposed hop distance $d^*=D=N^*$ as input parameters prior to selecting the proposed route and cluster set. In some embodiments, each terminal finds the next-hop terminal that is a distance roughly d* away to proceed with multi-hop routing and clustering. Thus, different physical channel parameters and constraints lead to different criteria for each pair of source and destination terminals 120 and 122.

In some embodiments, the framework for the number of hops and hop distance includes power-limited transmissions, where each terminal has a strict total average power constraint P over the whole transmission bandwidth B. In some embodiments, the framework for the proposed number of hops and hop distance also includes power spectral density limited transmissions, where each terminal ensures that its transmit signal meets a power spectral density (PSD) constraint, $\rho$, in all parts of the available spectrum (i.e., over the bandwidth, B, average transmit power does not exceed $\rho B$).

In one embodiment, the cluster determination engine 210 computes the following power-limited cluster route algorithm in order to enable the transmission of a network communication over the ad-hoc network system 100 at the end-to-end threshold data rate, C, for a given power-limit, given by:

$$C = \frac{B}{N} \log_2\left(1 + \frac{P}{N_0 B}\left(\frac{D}{N}\right)^{-\alpha(D/N,f)}\right) \quad (1)$$

Equation (1) is one embodiment of the power-limited cluster route algorithm, where C is the end-to-end threshold data rate in bits per second, B is the entire bandwidth in Hertz between the source terminal 120 and the destination terminal 124, N is the proposed number of hops to achieve the maximum data at the given power-limit, P, or threshold allowable power transmission in decibels (dBm), where 1 Watt of power is roughly equivalent to 30 dBm. $N_0$ is the single-sided noise spectral density, the noise power per unit of bandwidth, or the power spectral density (PSD) of the noise in Watts per Hertz. D is the distance, or range, between the source terminal 120 and the destination terminal 124. $\alpha(D/N, f)$ is the path loss exponent function, which depends on the per-hop distance D/N and operating frequency f, where $\alpha$ is the path loss exponent. Path loss is the reduction, or attenuation, in power density of an electromagnetic wave as it propagates through space.

In one embodiment, the modeling of the path loss exponent function as a function of range and carrier frequency is modeled for high frequency communications, in which the path loss exponent depends on operating frequency as well as transmission range. The end-to-end data rate, C, in (1) can be directly computed for various candidate values of N to obtain the value for the proposed number of hops, given by:

$$N^* = \operatorname*{argmax}_N \frac{B}{N} \log_2\left(1 + \frac{P}{N_0 B}\left(\frac{D}{N}\right)^{-\alpha(D/N,f)}\right) \quad (2)$$

In one embodiment, after the computation of N*, each terminal determines the proposed hop distance as d*=D/N*. The resultant per-link average received signal-to-noise ratio (SNR) is given by:

$$\Gamma = \beta \frac{P}{N_0 B}\left(\frac{D}{N^*}\right)^{-\alpha(D/N^*,f)}$$

The factor $\beta$ accounts for the average SNR loss due to shadowing and microscopic fading. With this choice of N*, if $\Gamma$ falls below the SNR threshold to support the lowest modulation and coding scheme (MCS), then the selected value of N is increased to be able to establish the minimum-rate inter-cluster connectivity. In one embodiment, instead of increasing N, MIMO techniques are implemented to improve SNR conditions through beam-forming gains. In this case, the achievable $\Gamma$ can be accurately approximated as:

$$\Gamma \approx M^2 \beta \frac{P}{N_0 B}\left(\frac{D}{N^*}\right)^{-\alpha(D/N^*,f)}$$

In some embodiments, terminals are assumed to use M-antenna MIMO beam-forming techniques for transmission and reception.

In some embodiments, each terminal in the ad-hoc network system 100 meets a power spectral density constraint, $\rho$, where, over the entire bandwidth, B, the transmit power of a signal does not exceed the product $\rho B$. PSD is the square of the magnitude of the continuous Fourier transform of a transmitted signal, given in Watts per Hertz (Hz). The PSD may be referred to as the spectrum of a transmitted signal and describes how the power of a signal is distributed with frequency. In one embodiment, the cluster determination engine 210 computes the following PSD-limited cluster route algorithm in order to enable the transmission of a network communication over the ad-hoc network system 100 at the end-to-end threshold data rate, C, for a given power-limit, given by:

$$C = \frac{B}{N} \log_2\left(1 + \rho\left(\frac{D}{N}\right)^{-\alpha(D/N,f)}\right) \quad (3)$$

Equation (3) is one embodiment of the PSD-limited cluster route algorithm, where C is the end-to-end threshold data rate in bits per second, B is the entire bandwidth in Hertz between the source terminal 120 and the destination terminal 124, and N represents the candidate number of hops to achieve a data rate at the given PSD-limit. $\rho$ is the PSD-limit, or threshold allowable power spectral density, D is the distance, or range, between the source terminal 120 and the destination terminal 124, and $\alpha(D/N, f)$ represents the path loss exponent function.

The end-to-end data rate, C, in (3) can be directly computed for various candidate values of N to obtain the proposed value for the number of hops, given by:

$$N^* = \operatorname*{argmax}_N \frac{B}{N} \log_2\left(1 + \frac{\rho}{N_0}\left(\frac{D}{N}\right)^{-\alpha(D/N,f)}\right) \quad (4)$$

After the computation of N*, each terminal can determine the proposed hop distance as d*=D/N*. The resultant per-link average received SNR would then be:

$$\Gamma = \beta \frac{\rho}{N_0}\left(\frac{D}{N^*}\right)^{-\alpha(D/N^*,f)}$$

With this choice of N*, if $\Gamma$ falls below the SNR threshold to support the lowest MCS, then the selected value of N is increased to be able to establish the minimum-rate inter-cluster connectivity. In one embodiment, instead of increasing N, multiple-input multiple-output (MIMO) techniques are implemented to improve SNR conditions through beam-forming gains. In this case, the achievable $\Gamma$ can be accurately approximated as:

$$\Gamma \approx M^2 \beta \frac{\rho}{N_0}\left(\frac{D}{N^*}\right)^{-\alpha(D/N^*,f)}$$

In some embodiments, terminals are assumed to use M-antenna MIMO beam-forming techniques for transmission and reception. Note that the dependency of N* on bandwidth is different for power-limited and PSD-limited cases. In particular in the power-limited case, more bandwidth implies a larger N while, in the PSD-limited case, N* does not depend on bandwidth while C does.

In cases where the communication can take place over a variety channels with different carrier frequencies (e.g., when using unlicensed spectrum), the proposed number of hops and therefore, the proposed hop distance is sensitive to variations in carrier frequency since path loss exponent is a function of the carrier frequency. In one embodiment, each terminal stores a lookup table 212 for the path loss exponent function α(range, f) that depends on a range and carrier frequency. In particular, each terminal can store a different entry for each of its available bands (including licensed and unlicensed bands). The next-hop terminal can be selected to be the one with the proposed hop distance over the given band. If the terminal switches from one channel to another during transmission/reception, the multi-hop routing and clustering algorithms can account for the change in the proposed hop distance, which can be recalculated based on the new path loss exponent obtained from the lookup table 212 corresponding to the new carrier frequency value. A new route and set of clusters can be constructed accordingly in a frequency-dependent manner using the corresponding values for the proposed number of hops and proposed hop distance.

At high frequencies (e.g., 60 GHz spectrum), high path loss provides spatial isolation against interference, and also directional antennas and MIMO capabilities enable spatial focusing with little interference to other terminals. Since the wavelength is small, in one embodiment, the ad-hoc network system 100 includes a number of antennas together in each device for MIMO beam-forming, spatial power combining, and beam steering. An example of multi-hop routing in the presence of spatial reuse is simultaneous transmissions on the same frequency band by multiple terminals over a given multi-hop routing path that are scheduled to improve network capacity and throughput. In this setting, in one embodiment, the cluster determination engine 210 first computes the proposed number of hops and proposed hop distance using the capacity functions with no spatial reuse, and then evaluates the end-to-end performance by considering various levels of spatial reuse. For an N-hop path, spatial reuse gain of up to N/2 may be achieved in a half-duplex wideband mesh network in the path-loss dominated regime due to the spatial isolation.

In the path loss dominated regime, in one embodiment, a Viterbi routing algorithm may be implemented by the cluster determination engine 210. The Viterbi routing algorithm exploits the spatial isolation in the presence of high path loss and considers only connectivity to the closest (i.e., adjacent) next-hop neighbors. In some embodiments, the path loss dominated regime is defined as the regime in which the path loss exponent exceeds a certain predetermined threshold value (e.g., 4). In one embodiment, when a particular band becomes available, the transmit terminal determines whether to use the Viterbi routing algorithm or not by comparing the path loss exponent corresponding to that band (learned from the lookup table 212 described above) with the predetermined threshold value, and uses the Viterbi routing scheme if the path loss exponent exceeds the threshold.

The Viterbi routing algorithm reduces the path search space to a trellis of mesh terminals where paths between non-adjacent terminals are ignored. This simplification reduces the general routing problem of finding a minimum cost path over a weighted graph (which can be solved using Dijkstra's algorithm) to a simpler layered network routing problem that can be solved with the Viterbi algorithm. In one embodiment, the Viterbi routing algorithm is combined with directional antennas and beam switching among various antenna patterns for the terminals in a mesh network. In some embodiments, low to medium-gain antennas are implemented.

In one embodiment, a cluster routing protocol accommodates diverse operator-specified policies regarding preferences for utilizing a combination of licensed and unlicensed frequencies and a variety of radio protocols, routing traffic over a mix of frequency bands. In one embodiment, the cluster determination engine 210 automatically determines a frequency band over which to close mesh links and support multi-hop routing across different licensed and/or unlicensed bands. This enables the mesh to increase overall system capacity through the use of multiple frequency bands. In some embodiments, the ad-hoc network system 100 implements terminals with cognitive radio capabilities such as Dynamic Spectrum Access Networks (DSANs).

In one embodiment, the path loss exponent for different channels can again be stored in a lookup table 212 for different ranges and carrier frequencies. For example, a cognitive radio may find two bands available at frequencies $f_1$ and $f_2$ and the proposed number of hops for these channels may be found, for example, to be 2 and 3, respectively (due to the differences in physical layer channel conditions and path loss characteristics), leading to different proposed hop distances.

Figure 3:
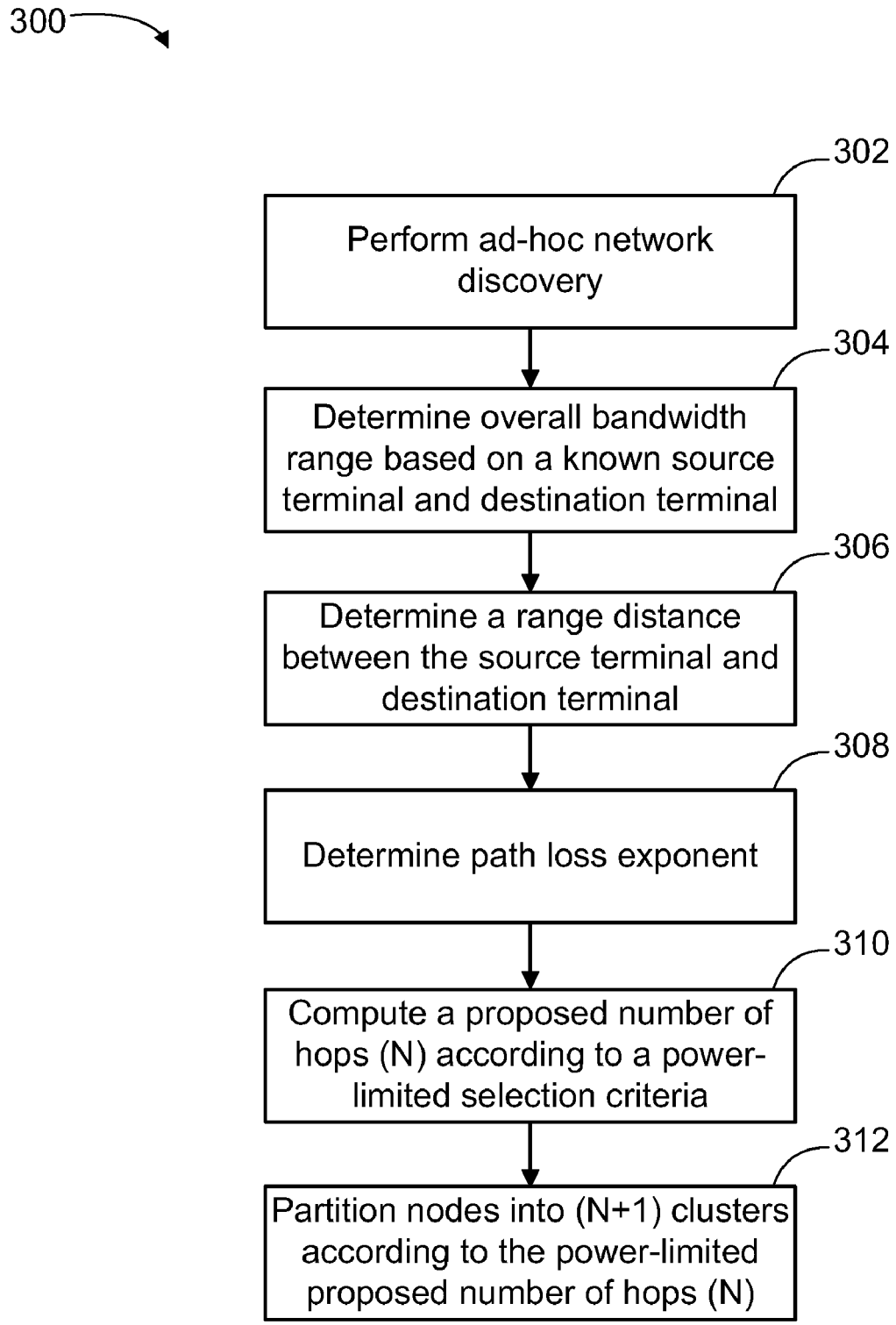
FIG. 3 depicts a schematic flow chart diagram of one embodiment of a power-limited node-clustering method for use with the cluster determination engine of FIG. 2.

FIG. 3 depicts a schematic flow chart diagram of one embodiment of a power-limited node-clustering method 300 for use with the cluster determination engine 210 of FIG. 2. Although the power-limited node-clustering method 300 is described in conjunction with the cluster determination engine 210 of FIG. 2, some embodiments of the method 300 may be implemented with other types of cluster determination engines.

At block 302, the cluster determination engine 210 performs an ad-hoc network discovery according to an ad-hoc network routing protocol according to a cluster protocol. The ad-hoc network routing protocol may be some combination of the cluster protocol and a pro-active routing protocol, a reactive routing protocol, a hybrid routing protocol, or another similar type of protocol. A pro-active, or table-driven, routing protocol maintains up-to-date lists of routing information by periodically distributing routing tables throughout the network, such as ad-hoc wireless distribution service (AWDS). A reactive, or on-demand, routing protocol discovers route information on demand by flooding the network with route request packets, such as ad-hoc on-demand distance vector (AODV).

At block 304, the cluster determination engine 210 determines an overall available bandwidth between the source terminal 120 and the destination terminal 124. At block 306, the cluster determination engine 210 determines an overall distance between the source terminal 120 and the destination terminal 124. The distance may include a range of distances between the plurality of terminals located in the destination cluster 106 and the last relay cluster 104, and may be based on the different bandwidths available between the plurality of terminals located in the last relay cluster 104 and the destination cluster 106.

At block 308, the cluster determination engine 210 determines a value of a path loss exponent. At block 310, the cluster determination engine 210 computes a proposed number of hops N* between the source terminal 120 and the destination terminal 124 according to a power-limited selection criteria.

At block 312, the cluster determination engine 210 selects the plurality of nodes, or terminals, between the source node and the destination node, and partitions the plurality of nodes, including the source node and the destination node, into a proposed number of clusters according to the power-limited physical layer channel characteristics. The computed number of clusters enables the plurality of terminals to send and relay a given network communication, for example, at a threshold data rate for the given power-limited selection criteria. In other words, computing a power-limited data rate algorithm and solving for the number of hops as a function of bandwidth, B, transmission power, P, and path loss exponent function, α(D/N, f), gives a proposed number of hops, N*. In some cases, the proposed number of hops may be optimal, or relatively high, in that the data rate, C, approaches the highest available data rate between the source node, the plurality of relay nodes, and the destination node.

Figure 4:
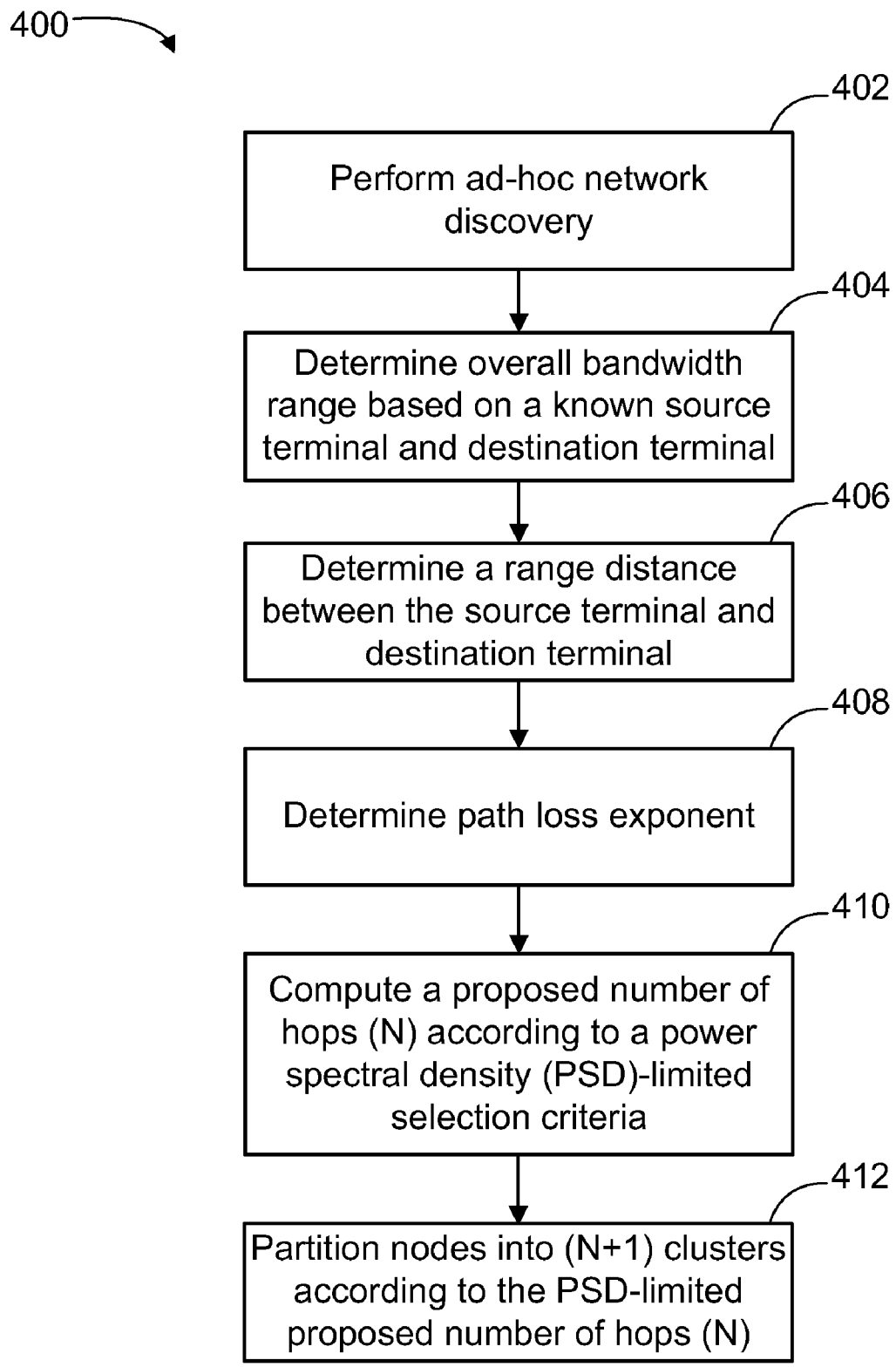
FIG. 4 depicts a schematic flow chart diagram of one embodiment of a power spectral density (PSD) limited node-clustering method for use with the cluster determination engine of FIG. 2.

FIG. 4 depicts a schematic flow chart diagram of one embodiment of a power spectral density (PSD) limited node-clustering method 400 for use with the cluster determination engine 210 of FIG. 2. Although the PSD-limited node-clustering method 400 is described in conjunction with the cluster determination engine 210 of FIG. 2, some embodiments of the method 400 may be implemented with other types of cluster determination engines. The operations of the method 400 of FIG. 4 are configured to operate in substantially the same manner described above in regards to FIG. 3, except as noted below.

At block 410, the cluster determination engine 210 computes a proposed number of hops N* between the source terminal 120 and the destination terminal 124 according to a power spectral density (PSD) limited selection criteria.

At block 412, the cluster determination engine 210 selects the plurality of nodes, or terminals, between the source node and the destination node, and partitions the plurality of nodes, inclusive of the source node and the destination node, into a proposed number of clusters according to the PSD-limited physical layer channel characteristics. The computed number of clusters enables the plurality of terminals to send and relay a given network communication at a threshold data rate for the given PSD-limited selection criteria. In other words, computing a PSD-limited data rate algorithm and solving for the number of hops as a function of the PSD constraint, ρ, bandwidth, B, and path loss exponent function, α(D/N, f), gives a proposed number of hops, N*. In some cases, the proposed number of hops may be optimal, or relatively high, in that the data rate, C, approaches the highest available data rate between the source node, the plurality of relay nodes, and the destination node.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:
a source terminal configured to generate and send a wireless communication to a destination terminal across at least one of a plurality of relay terminals that are between the source terminal and the destination terminal; and
a cluster determination engine coupled to the source terminal, wherein the cluster determination engine is configured to compute a threshold data rate, C, based on a number of hops, N, and based on a transmission power constraint, wherein the cluster determination engine is further configured to determine a proposed route for the wireless communication from the source terminal to the destination terminal according to the computed threshold data rate, C, and wherein the cluster determination engine is further configured to:
compute the threshold data rate, C, further based on a derivative of the threshold data rate, C, over the number of hops, N;
determine a proposed number of hops, N*, based on the computed threshold data rate, C;
determine a proposed hop distance, D/N, based on the proposed number of hops, N*, wherein D is the distance between the source terminal and the destination terminal and N is the number of hops;
determine the route further based on the proposed hop distance, D/N;
compute a signal-to-noise ratio, Γ, based on the proposed number of hops, N*; and
partition the source terminal, the plurality of relay terminals, and the destination terminal into a plurality of clusters based on the determination of the proposed hop distance, D/N.

2. The system of claim 1, wherein the cluster determination engine is further configured to compute a per-link average received signal-to-noise ratio, Γ, based on the proposed number of hops, N*.

3. The system of claim 2, wherein the cluster determination engine is further configured to increase the proposed number of hops, N*, if the computed signal-to-noise ratio, Γ, is less than a predetermined threshold value.

4. The system of claim 2, wherein the cluster determination engine is further configured to employ multiple-input and multiple-output antennas.

5. The system of claim 1, wherein the cluster determination engine is further configured to perform an ad-hoc route enquiry to discover at least one of a plurality of physical layer channel characteristics and utilize the at least one of the plurality of physical layer channel characteristics to determine the proposed number of hops, the proposed hop distance, the plurality of clusters, and the proposed route, wherein the plurality of physical channel characteristics comprises:
an overall bandwidth between the source terminal and the destination terminal;
a distance between the source terminal and the destination terminal;
at least one operating frequency;
at least one channel bandwidth, wherein the at least one channel bandwidth corresponds to the at least one operating frequency;
at least one path loss exponent, wherein the at least one path loss exponent corresponds to the at least one operating frequency;
a spectrum availability;
a terminal transmission power constraint; and
a terminal power spectral density constraint.

6. The system of claim 1, wherein the cluster determination engine is further configured to store in a lookup table at least one path loss exponent for a specific channel, wherein a path loss exponent function depends on a specific range and a specific carrier frequency, and wherein the cluster determination engine is configured to store a different entry in the lookup table for each available channel.

7. The system of claim 6, wherein the cluster determination engine is further configured to compare a path loss exponent of an available frequency band to a predetermined threshold value, and to employ a Viterbi routing algorithm if the path loss exponent exceeds the predetermined threshold value.

8. The system of claim 1, wherein the cluster determination engine is further configured to employ a spatial reuse process to schedule simultaneous transmissions on a same frequency band by a plurality of terminals over a constructed route.

9. An ad-hoc networking method, comprising:

generating, by a cluster determination engine, data for a wireless communication;

computing, by the cluster determination engine, a threshold data rate, C, based on a number of hops, N, and based on a transmission power constraint, the threshold data rate, C, is further based on a derivative of the threshold data rate, C, over the number of hops, N;

determining, by the cluster determination engine, a route for the wireless communication from a source terminal device to a destination terminal device across at least one of a plurality of relay terminal devices based on the threshold data rate, C;

determining, by the cluster determination engine, a proposed number of hops, N*, based on the threshold data rate, C;

determining, by the cluster determination engine, a proposed hop distance, D/N, based on the proposed number of hops, N*, wherein determining the route is further based on the proposed hop distance, D/N, and wherein D is the distance between the source terminal and the destination terminal and N is the number of hops;

computing a signal-to-noise ratio, $\Gamma$, based on the proposed number of hops N*;

sending, by the cluster determination engine, the generated data to the destination terminal device across the at least one of the plurality of relay terminal devices; and partitioning the source terminal device, the plurality of relay terminal devices, and the destination terminal device into a plurality of clusters based on the determination of the proposed hop distance, D/N.

10. The method of claim 9, further comprising:

performing an ad-hoc route enquiry to discover at least one of a plurality of physical layer channel characteristics of a new frequency band and utilizing the at least one of the plurality of physical layer channel characteristics of the new frequency band to determine the proposed number of hops, the proposed hop distance, the plurality of clusters, and the proposed route for the new frequency band in response to a switch from a current frequency band to the new frequency band.

11. The method of claim 9, further comprising performing the ad-hoc route enquiry to discover at least one of a plurality of physical layer channel characteristics of each of a plurality of frequency bands and utilizing the at least one of the plurality of physical layer channel characteristics of each of the plurality of frequency bands simultaneously to determine the proposed number of hops, the proposed hop distance, the plurality of clusters, and the proposed route for the plurality of frequency bands.

12. The method of claim 9, further comprising:

performing an ad-hoc route enquiry to discover at least one of a plurality of physical layer channel characteristics; and utilizing the at least one of the plurality of physical layer channel characteristics to determine the proposed number of hops, the proposed hop distance, the plurality of clusters, and the proposed route, wherein the plurality of physical channel characteristics comprises:

an overall bandwidth between the source terminal device and the destination terminal device;

a distance between the source terminal device and the destination terminal device;

at least one operating frequency;

at least one channel bandwidth, wherein the at least one channel bandwidth corresponds to the at least one operating frequency;

at least one path loss exponent, wherein the at least one path loss exponent corresponds to the at least one operating frequency;

a spectrum availability;

a terminal transmission power constraint; and a terminal power spectral density constraint.

* * * * *